United States Patent
Li et al.

(10) Patent No.: US 11,178,584 B2
(45) Date of Patent: Nov. 16, 2021

(54) ACCESS METHOD, DEVICE AND SYSTEM FOR USER EQUIPMENT (UE)

(71) Applicant: HUAWEI TECHNOLOGIES CO., LTD., Guangdong (CN)

(72) Inventors: Na Li, Beijing (CN); Jingxue Zhong, Beijing (CN); Weiwei Zhong, Beijing (CN); Jing Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 431 days.

(21) Appl. No.: 15/927,873

(22) Filed: Mar. 21, 2018

(65) Prior Publication Data
US 2018/0220364 A1     Aug. 2, 2018

Related U.S. Application Data

(63) Continuation of application No. PCT/CN2015/090305, filed on Sep. 22, 2015.

(51) Int. Cl.
*H04W 36/00* (2009.01)
*H04W 12/043* (2021.01)
(Continued)

(52) U.S. Cl.
CPC ......... *H04W 36/0038* (2013.01); *H04L 63/08* (2013.01); *H04W 12/041* (2021.01);
(Continued)

(58) Field of Classification Search
CPC ......... H04W 4/00; H04W 4/02; H04W 4/025; H04W 4/06; H04W 4/20; H04W 4/203;
(Continued)

(56) References Cited

U.S. PATENT DOCUMENTS

2009/0042576 A1*   2/2009   Mukherjee ........... H04J 11/0093
                                                                                                                                                               455/436
2010/0054472 A1   3/2010   Anthony et al.
(Continued)

FOREIGN PATENT DOCUMENTS

CN       101083839 A     12/2007
CN       101420695 A      4/2009
(Continued)

OTHER PUBLICATIONS

3GPP TSG CT4 Meeting #69 C4-150819(3GPP TSG CT1 Meeting #92 C1-151666),"Mobile Equipment Identity signalling over WLAN",Alcatel-Lucent et al.,May 25-29, 2015,total 8 pages.
(Continued)

*Primary Examiner* — San Htun
(74) *Attorney, Agent, or Firm* — Womble Bond Dickinson (US) LLP

(57) ABSTRACT

The present application provides an access method, device, and system of UE, and relates to the communications field. The method is performed by a first network device on a 3GPP network, including: receiving, by using a second network device on a non-3GPP network, an access request message from the UE; generating a first NAS verification code according to an identifier of the UE and a NAS security context of the UE stored in the first network device; if the access request message includes a second NAS verification code, detecting whether the second NAS verification code is the same as the first NAS verification code; and if the second NAS verification code is the same as the first NAS verification code, sending an access key of the non-3GPP network to the second network device.

20 Claims, 13 Drawing Sheets

(51) Int. Cl.
- *H04W 76/20* (2018.01)
- *H04W 88/08* (2009.01)
- *H04L 29/06* (2006.01)
- *H04W 12/041* (2021.01)
- *H04W 12/062* (2021.01)
- *H04W 12/0431* (2021.01)
- *H04W 48/16* (2009.01)
- *H04W 88/06* (2009.01)
- *H04W 8/04* (2009.01)

(52) U.S. Cl.
CPC ..... *H04W 12/043* (2021.01); *H04W 12/0431* (2021.01); *H04W 12/062* (2021.01); *H04W 48/16* (2013.01); *H04W 76/20* (2018.02); *H04W 88/08* (2013.01); *H04W 8/04* (2013.01); *H04W 88/06* (2013.01)

(58) Field of Classification Search
CPC ............... H04W 4/30; H04W 4/50–80; H04W 76/20–38; H04L 63/08
See application file for complete search history.

(56) References Cited

U.S. PATENT DOCUMENTS

| | | | | |
|---|---|---|---|---|
| 2010/0115275 A1* | 5/2010 | Suh | ................ | H04W 12/08 713/168 |
| 2011/0138447 A1 | 6/2011 | Hui | | |
| 2012/0159151 A1* | 6/2012 | Janakiraman | ......... | H04L 43/028 713/153 |
| 2014/0071907 A1 | 3/2014 | Dinand et al. | | |
| 2015/0146870 A1 | 5/2015 | Rolf et al. | | |
| 2015/0215777 A1 | 7/2015 | Alexander et al. | | |
| 2016/0255574 A1 | 9/2016 | Shinji et al. | | |

FOREIGN PATENT DOCUMENTS

| | | |
|---|---|---|
| CN | 101577909 A | 11/2009 |
| CN | 101959281 A | 1/2011 |
| CN | 102047722 A | 5/2011 |
| CN | 104080156 A | 10/2014 |
| CN | 104540185 A | 4/2015 |
| CN | 104837182 A | 8/2015 |
| CN | 103609154 B | 8/2017 |
| CN | 104067665 B | 7/2018 |
| JP | 2012501604 A | 1/2012 |
| JP | 2013013125 A | 1/2013 |
| WO | 2013181847 A1 | 12/2013 |
| WO | 2014117811 A1 | 8/2014 |
| WO | 2015068472 A1 | 5/2015 |

OTHER PUBLICATIONS

International Search Report and Written Opinion of PCT Application No. PCT/CN2015/090305 dated Jun. 15, 2016, 9 pages.

* cited by examiner

ACCESS METHOD, DEVICE AND SYSTEM FOR USER EQUIPMENT (UE)

CROSS-REFERENCE TO RELATED APPLICATIONS

This application is a continuation of International Application No. PCT/CN2015/090305, filed on Sep. 22, 2015, the disclosure of which is hereby incorporated by reference in its entirety.

TECHNICAL FIELD

The present application relates to the communications field, and in particular, to an access method, device, and system for user equipment UE.

BACKGROUND

With development of science and technologies, a non 3rd Generation Partnership Project (Non-3GPP) network such as a wireless local area network (WLAN) and a 3GPP network such as a Long Term Evolution (LTE) network are increasingly widely used. The non-3GPP network is mainly specific to a personal consumption electronic market and a home and enterprise broadband wireless access market, and the 3GPP network is mainly specific to a telecommunication operator market, and provides a mobile communication service to the public. The two types of wireless networks (the non-3GPP network and the 3GPP network) have complementary advantages, and therefore, convergence of the non-3GPP network and the 3GPP network is a necessary trend.

In related technologies, the 3GPP network is divided into two parts: an access network and a core network. When user equipment (UE) accesses the core network of the 3GPP network by using the access network of the 3GPP network, a network device that is responsible for mobility management and other functions and that is on the core network of the 3GPP network, such as a mobility management entity (MME), performs Evolved Packet System Authentication and Key Agreement (EPS-AKA) authentication on the UE. After the authentication succeeds, the UE and the MME share a set of non-access stratum (NAS) security context. The NAS security context includes information such as a key, a NAS sequence number, and a NAS algorithm of the 3GPP network. When the UE is not within a coverage area of a base station on the 3GPP network, and is within a coverage area of the non-3GPP network, the UE accesses the core network of the 3GPP network by using an access network of the non-3GPP network, and an authentication, authorization, and accounting (AAA) server on the core network of the 3GPP network needs to perform Extensible Authentication Protocol (EAP)-AKA protocol-based authentication on the UE. Then, the AAA server determines to allow the UE to access the network. The UE and the non-3GPP network each generate an access key or an AS key of the non-3GPP network, and the UE and the non-3GPP network perform communication by using the generated access key or AS key.

In the EAP-AKA protocol-based authentication process, the AAA server needs to perform authentication on the UE, and a relatively long delay is caused in the authentication process. Consequently, an overall communication delay is relatively long.

SUMMARY

To resolve a problem that an overall communication delay is relatively long when UE accesses a 3GPP network by using a non-3GPP network, the present application provides an access method, device, and system of user equipment UE. The technical solutions are as follows:

According to a first aspect, an access method of user equipment UE is provided, where the method includes:

receiving, by a first network device on a 3rd Generation Partnership Project 3GPP network by using a second network device on a non 3rd Generation Partnership Project non-3GPP network, an access request message sent by the user equipment UE, where the access request message includes an identifier of the UE;

generating, by the first network device, a first non-access stratum NAS verification code based on the identifier of the UE and a NAS security context of the UE that is stored in the first network device;

if the access request message includes a second NAS verification code, detecting, by the first network device, whether the second NAS verification code is the same as the first NAS verification code, where the second NAS verification code is a verification code that is generated by the UE based on a NAS security context stored in the UE; and if the second NAS verification code is the same as the first NAS verification code, sending, by the first network device, an access key of the non-3GPP network to the second network device.

With reference to the first aspect, in a first possible implementation of the first aspect, before the sending, by the first network device, an access key of the non-3GPP network to the second network device, the method further includes:

determining, by the first network device, the access key of the non-3GPP network based on a NAS sequence number of the 3GPP network, a key of the 3GPP network, and a type identifier of the non-3GPP network.

With reference to the first possible implementation of the first aspect, in a second possible implementation of the first aspect, before the determining, by the first network device, the access key of the non-3GPP network based on a NAS sequence number of the 3GPP network, a key of the 3GPP network, and a type identifier of the non-3GPP network, the method further includes:

obtaining, by the first network device from the NAS security context of the UE stored in the first network device, the NAS sequence number of the 3GPP network and the key of the 3GPP network; and receiving, by the first network device, the type identifier of the non-3GPP network sent by the second network device.

With reference to the first aspect, in a third possible implementation of the first aspect, the method further includes:

if the second NAS verification code is different from the first NAS verification code, performing, by the first network device, security authentication on the UE; or if the access request message does not include a NAS verification code, performing, by the first network device, security authentication on the UE.

With reference to the third possible implementation of the first aspect, in a fourth possible implementation of the first aspect, the performing, by the first network device, security authentication on the UE includes:

sending, by the first network device, an authentication message to the UE by using the second network device; and receiving, by the first network device by using the second network device, an authentication response message corresponding to the authentication message from the UE.

With reference to the fourth possible implementation of the first aspect, in a fifth possible implementation of the first aspect, after the receiving, by the first network device by using the second network device, an authentication response message corresponding to the authentication message from the UE, the method further includes:

sending, by the first network device, an access success message to the UE by using the second network device.

With reference to any one of the first aspect and the first to the fifth possible implementations of the first aspect, in a sixth possible implementation of the first aspect, before the sending, by the first network device, an access key of the non-3GPP network to the second network device, the method further includes:

obtaining, by the first network device, capability information of the UE, where the capability information is used to indicate a capability of the UE on the non-3GPP network; and sending, by the first network device, the capability information to the second network device, where the capability information is used by the second network device to determine a cryptographic algorithm, and the cryptographic algorithm is used by the second network device to generate an access stratum AS key of the non-3GPP network.

With reference to any one of the first aspect and the first to the sixth possible implementations of the first aspect, in a seventh possible implementation of the first aspect, the second network device is a wireless access point AP.

According to a second aspect, an access method of user equipment UE is provided, where the method includes:

generating, by the user equipment UE, an access request message, where the access request message includes an identifier of the UE; and sending, by the UE, the access request message to a first network device on a 3rd Generation Partnership Project 3GPP network by using a second network device on a non 3rd Generation Partnership Project non-3GPP network.

With reference to the second aspect, in a first possible implementation of the second aspect, after the sending, by the UE, the access request message to a first network device on a 3rd Generation Partnership Project 3GPP network by using a second network device on a non 3rd Generation Partnership Project non-3GPP network, the method further includes:

determining, by the UE, an access key of the non-3GPP network based on a NAS sequence number of the 3GPP network, a key of the 3GPP network, and a preset type identifier of the non-3GPP network.

With reference to the second aspect, in a second possible implementation of the second aspect, the access request message includes a second non-access stratum NAS verification code, and before the generating, by the user equipment UE, an access request message, the method further includes:

generating, by the UE, the second NAS verification code based on a NAS security context stored in the UE.

With reference to the second aspect, in a third possible implementation of the second aspect, after the sending, by the UE, the access request message to a first network device on a 3rd Generation Partnership Project 3GPP network by using a second network device on a non 3rd Generation Partnership Project non-3GPP network, the method further includes:

receiving, by the UE by using the second network device, an authentication message sent by the first network device, where the authentication message is generated by the first network device when the first network device determines that the access request message includes a second NAS verification code and that the second NAS verification code is different from a first NAS verification code or when the access request message does not include a NAS verification code, and the first NAS verification code is a verification code that is generated by the first network device based on the identifier of the UE and a NAS security context of the UE that is stored in the first network device; and sending, by the UE by using the second network device, an authentication response message corresponding to the authentication message to the first network device.

With reference to the third possible implementation of the second aspect, in a fourth possible implementation of the second aspect, after the sending, by the UE by using the second network device, an authentication response message corresponding to the authentication message to the first network device, the method further includes:

receiving, by the UE by using the second network device, an access success message sent by the first network device.

With reference to the first possible implementation of the second aspect, in a fifth possible implementation of the second aspect, after the determining, by the UE, an access key of the non-3GPP network based on a NAS sequence number of the 3GPP network, a key of the 3GPP network, and a preset type identifier of the non-3GPP network, the method further includes:

generating, by the UE, an access stratum AS key of the non-3GPP network based on the access key of the non-3GPP network.

With reference to the fifth possible implementation of the second aspect, in a sixth possible implementation of the second aspect, the generating, by the UE, an access stratum AS key of the non-3GPP network based on the access key of the non-3GPP network includes:

receiving, by the UE, a cryptographic algorithm sent by the second network device; and generating, by the UE, the AS key of the non-3GPP network based on the cryptographic algorithm, the access key of the non-3GPP network, and the type identifier of the non-3GPP network.

With reference to any one of the second aspect and the first to the sixth possible implementations of the second aspect, in a seventh possible implementation of the second aspect, the second network device is a wireless access point AP.

According to a third aspect, an access device of user equipment UE is provided, where the access device of the user equipment UE includes:

a first receiving unit, configured to receive, by using a second network device on a non 3rd Generation Partnership Project non-3GPP network, an access request message sent by the user equipment UE, where the access request message includes an identifier of the UE;

a generation unit, configured to generate a first non-access stratum NAS verification code based on the identifier of the UE and a NAS security context of the UE that is stored in the access device of the UE;

a detection unit, configured to: when the access request message includes a second NAS verification code, detect whether the second NAS verification code is the same as the first NAS verification code, where the second NAS verification code is a verification code that is generated by the UE based on a NAS security context stored in the UE; and a first sending unit, configured to: when the second NAS verification code is the same as the first NAS verification code, send an access key of the non-3GPP network to the second network device.

With reference to the third aspect, in a first possible implementation of the third aspect, the device further includes:

a determining unit, configured to determine the access key of the non-3GPP network based on a NAS sequence number of the 3GPP network, a key of the 3GPP network, and a type identifier of the non-3GPP network.

With reference to the first possible implementation of the third aspect, in a second possible implementation of the third aspect, the device further includes:

a first obtaining unit, configured to obtain, from the NAS security context of the UE stored in the access device of the UE, the NAS sequence number of the 3GPP network and the key of the 3GPP network; and a second receiving unit, configured to receive the type identifier of the non-3GPP network sent by the second network device.

With reference to the third aspect, in a third possible implementation of the third aspect, the device further includes:

a first obtaining unit, configured to obtain, from the NAS security context of the UE stored in the access device of the UE, a NAS sequence number of the 3GPP network and a key of the 3GPP network; and an authentication unit, configured to: when the second NAS verification code is different from the first NAS verification code, perform security authentication on the UE; or when the access request message does not include a NAS verification code, perform security authentication on the UE.

With reference to the third possible implementation of the third aspect, in a fourth possible implementation of the third aspect, the authentication unit further includes:

a sending module, configured to send an authentication message to the UE by using the second network device; and a receiving module, configured to receive, by using the second network device, an authentication response message corresponding to the authentication message from the UE.

With reference to the fourth possible implementation of the third aspect, in a fifth possible implementation of the third aspect, the device further includes:

a second sending unit, configured to send an access success message to the UE by using the second network device.

With reference to any one of the third aspect and the first to the fifth possible implementations of the third aspect, in a sixth possible implementation of the third aspect, the device further includes:

a second obtaining unit, configured to obtain capability information of the UE, where the capability information is used to indicate a capability of the UE on the non-3GPP network; and a third sending unit, configured to send the capability information to the second network device, where the capability information is used by the second network device to determine a cryptographic algorithm, and the cryptographic algorithm is used by the second network device to generate an access stratum AS key of the non-3GPP network.

With reference to any one of the third aspect and the first to the sixth possible implementations of the third aspect, in a seventh possible implementation of the third aspect, the second network device is a wireless access point AP.

According to a fourth aspect, an access device of user equipment UE is provided, where the access device of the user equipment UE includes:

a first generation unit, configured to generate an access request message, where the access request message includes an identifier of the access device of the UE; and a first sending unit, configured to send the access request message to a first network device on a 3rd Generation Partnership Project 3GPP network by using a second network device on a non 3rd Generation Partnership Project non-3GPP network.

With reference to the fourth aspect, in a first possible implementation of the fourth aspect, the device further includes:

a determining unit, configured to determine an access key of the non-3GPP network based on a NAS sequence number of the 3GPP network, a key of the 3GPP network, and a preset type identifier of the non-3GPP network.

With reference to the fourth aspect, in a second possible implementation of the fourth aspect, the device further includes:

a second generation unit, configured to generate the second NAS verification code based on a NAS security context stored in the access device of the UE.

With reference to the fourth aspect, in a third possible implementation of the fourth aspect, the device further includes:

a first receiving unit, configured to receive, by using the second network device, an authentication message sent by the first network device, where the authentication message is generated by the first network device when the first network device determines that the access request message includes a second NAS verification code and that the second NAS verification code is different from a first NAS verification code or when the access request message does not include a NAS verification code, and the first NAS verification code is a verification code that is generated by the first network device based on the identifier of the access device of the UE and a NAS security context of the access device of the UE that is stored in the first network device; and a second sending unit, configured to send, by using the second network device, an authentication response message corresponding to the authentication message to the first network device.

With reference to the third possible implementation of the fourth aspect, in a fourth possible implementation of the fourth aspect, the device further includes:

a second receiving unit, configured to receive, for the access device of the UE by using the second network device, an access success message sent by the first network device.

With reference to the first possible implementation of the fourth aspect, in a fifth possible implementation of the fourth aspect, the device further includes:

a third generation unit, configured to generate an access stratum AS key of the non-3GPP network based on the access key of the non-3GPP network.

With reference to the fifth possible implementation of the fourth aspect, in a sixth possible implementation of the fourth aspect, the third generation unit includes:

a receiving module, configured to receive a cryptographic algorithm sent by the second network device; and a generation module, configured to generate the AS key of the non-3GPP network based on the cryptographic algorithm, the access key of the non-3GPP network, and the type identifier of the non-3GPP network.

With reference to the fourth aspect and the first to the sixth possible implementations of the fourth aspect, in a seventh possible implementation of the fourth aspect, the second network device is a wireless access point AP.

According to a fifth aspect, an access device of user equipment UE, where the access device of the UE includes: a receiver, a transmitter, a processor, a bus, and a memory, where the bus is configured to connect the receiver, the transmitter, the processor, and the memory, and the processor is configured to execute a program stored in the memory, where the receiver is configured to receive, by using a second network device on a non 3rd Generation Partnership Project non-3GPP network, an access request message sent by the user equipment UE, where the access request message includes an identifier of the UE;

the processor is configured to generate a first non-access stratum NAS verification code based on the identifier of the UE and a NAS security context of the UE that is stored in the access device of the UE;

the processor is further configured to: when the access request message includes a second NAS verification code, detect whether the second NAS verification code is the same as the first NAS verification code, where the second NAS verification code is a verification code that is generated by the UE based on a NAS security context stored in the UE; and the transmitter is configured to: when the second NAS verification code is the same as the first NAS verification code, send an access key of the non-3GPP network to the second network device.

With reference to the fifth aspect, in a first possible implementation of the fifth aspect, the processor is further configured to:

determine the access key of the non-3GPP network based on a NAS sequence number of the 3GPP network, a key of the 3GPP network, and a type identifier of the non-3GPP network.

With reference to the first possible implementation of the fifth aspect, in a second possible implementation of the fifth aspect, the processor is further configured to:

obtain, from the NAS security context of the UE stored in the access device of the UE, the NAS sequence number of the 3GPP network and the key of the 3GPP network; and the receiver is further configured to:

receive the type identifier of the non-3GPP network sent by the second network device.

With reference to the fifth aspect, in a third possible implementation of the fifth aspect, the processor is further configured to:

when the second NAS verification code is different from the first NAS verification code, perform security authentication on the UE; or when the access request message does not include a NAS verification code, perform security authentication on the UE.

With reference to the third possible implementation of the fifth aspect, in a fourth possible implementation of the fifth aspect, the processor is specifically configured to:

send an authentication message to the UE by using the second network device; and receive, by using the second network device, an authentication response message corresponding to the authentication message from the UE.

With reference to the fourth possible implementation of the fifth aspect, in a fifth possible implementation of the fifth aspect, the transmitter is further configured to:

send an access success message to the UE by using the second network device.

With reference to any one of the fifth aspect and the first to the fifth possible implementations of the fifth aspect, in a sixth possible implementation of the fifth aspect, the processor is further configured to:

obtain capability information of the UE, where the capability information is used to indicate a capability of the UE on the non-3GPP network; and the transmitter is further configured to:

send the capability information to the second network device, where the capability information is used by the second network device to determine a cryptographic algorithm, and the cryptographic algorithm is used by the second network device to generate an access stratum AS key of the non-3GPP network.

With reference to any one of the fifth aspect and the first to the sixth possible implementations of the fifth aspect, in a seventh possible implementation of the fifth aspect, the second network device is a wireless access point AP.

According to a sixth aspect, an access device of user equipment UE is provided, where the access device of the UE includes: a transmitter, a processor, a bus, and a memory, where the bus is configured to connect the transmitter, the processor, and the memory, and the processor is configured to execute a program stored in the memory, where the processor is configured to generate an access request message, where the access request message includes an identifier of the access device of the UE; and the transmitter is configured to send the access request message to a first network device on a 3rd Generation Partnership Project 3GPP network by using a second network device on a non 3rd Generation Partnership Project non-3GPP network.

With reference to the sixth aspect, in a first possible implementation of the sixth aspect, the processor is further configured to:

determine an access key of the non-3GPP network based on a NAS sequence number of the 3GPP network, a key of the 3GPP network, and a preset type identifier of the non-3GPP network.

With reference to the sixth aspect, in a second possible implementation of the sixth aspect, the processor is further configured to:

generate the second NAS verification code based on a NAS security context stored in the access device of the UE.

With reference to the sixth aspect, in a third possible implementation of the sixth aspect, the device further includes:

a receiver, configured to receive, by using the second network device, an authentication message sent by the first network device, where the authentication message is generated by the first network device when the first network device determines that the access request message includes a second NAS verification code and that the second NAS verification code is different from a first NAS verification code or when the access request message does not include a NAS verification code, and the first NAS verification code is a verification code that is generated by the first network device based on the identifier of the access device of the UE and a NAS security context of the access device of the UE that is stored in the first network device; and the transmitter is further configured to send, by using the second network device, an authentication response message corresponding to the authentication message to the first network device.

With reference to the third possible implementation of the sixth aspect, in a fourth possible implementation of the sixth aspect, the receiver is further configured to:

receive, by using the second network device, an access success message sent by the first network device.

With reference to the first possible implementation of the sixth aspect, in a fifth possible implementation of the sixth aspect, the processor is further configured to:

generate an access stratum AS key of the non-3GPP network based on the access key of the non-3GPP network.

With reference to the fifth possible implementation of the sixth aspect, in a sixth possible implementation of the sixth aspect, the processor is specifically configured to:

receive a cryptographic algorithm sent by the second network device; and generate the AS key of the non-3GPP network based on the cryptographic algorithm, the access key of the non-3GPP network, and the type identifier of the non-3GPP network.

With reference to the sixth aspect and the first to the sixth possible implementations of the sixth aspect, in a seventh possible implementation of the sixth aspect, the second network device is a wireless access point AP.

According to a seventh aspect, an access system of user equipment UE is provided, where the access system of the user equipment UE includes:

the access device of the UE according to any implementation of the third aspect; and the access device of the UE according to any implementation of the fourth aspect.

According to an eighth aspect, an access system of user equipment UE is provided, where the access system of the user equipment UE includes:

the access device of the UE according to any implementation of the fifth aspect; and the access device of the UE according to any implementation of the sixth aspect.

Beneficial effects of the technical solutions provided in the present application are: According to the access method of the UE provided in the present application, because the first network device on the 3GPP network can receive, by using the second network device on the non-3GPP network, the access request message sent by the UE, if the access request message includes the second NAS verification code, and the second NAS verification code is the same as the first NAS verification code that is generated by the first network device based on the identifier of the UE and the NAS security context of the UE that is stored in the first network device, the first network device sends the access key of the non-3GPP network to the second network device. Compared with a related technology, in the present application, it is not required that an AAA server performs authentication on the UE, so that a delay caused in an authentication process is reduced. Therefore, an overall communication delay is reduced.

It should be understood that, the foregoing general description and the following detailed description are merely used as examples and used for explanation, and do not construed as a limitation on the present application.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 4-2 is a flowchart of a method for generating an AS key of a non-3GPP network according to an embodiment of the present application.

FIG. 4-3 is a flowchart for performing security authentication by an MME on UE according to an embodiment of the present application.

FIG. 6-1 is a schematic structural diagram of another access device of UE according to an embodiment of the present application.

FIG. 6-2 is a schematic structural diagram of an authentication unit according to an embodiment of the present application.

FIG. 8-1 is a schematic structural diagram of another access device of UE according to an embodiment of the present application.

FIG. 8-2 is a schematic structural diagram of a third generation unit according to an embodiment of the present application.

FIG. 10-1 is a schematic structural diagram of another access device of UE according to an embodiment of the present application.

FIG. 10-2 is a schematic structural diagram of another access device of UE according to an embodiment of the present application.

The foregoing accompanying drawings show specific embodiments of the present application, and more detailed descriptions are provided in the following. The accompanying drawings and text descriptions are not intended to limit the scope of the idea of the present application in any manner, but are intended to describe the concept of the present application to a person skilled in the art with reference to particular embodiments.

DESCRIPTION OF EMBODIMENTS

To make the objectives, technical solutions, and advantages of the present application clearer, the following further describes the embodiments of the present application in detail with reference to the accompanying drawings.

Figure 1:
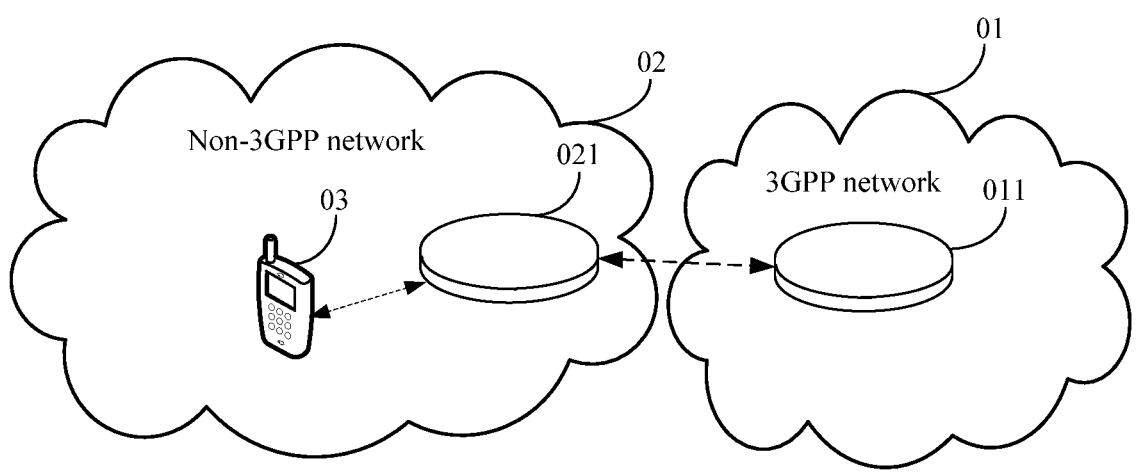
FIG. 1 is a schematic diagram of an implementation environment in which an access method of UE is used according to an embodiment of the present application.

FIG. 1 is a schematic diagram of an implementation environment in which an access method of UE is used according to an embodiment of the present application. In the implementation environment, a 3GPP network 01 and a non-3GPP network 02 may be included. The 3GPP network 01 includes a first network device 011, and the non-3GPP network 02 includes a second network device 021. UE 03 on the non-3GPP network 02 can implement information exchange with the first network device 011 on the 3GPP network 01 by using the second network device 021. The UE 03 can share a NAS message with the first network device 011 on the 3GPP network 01. A NAS security context stored in the first network device 011 is the same as a NAS security context stored in the UE 03.

In the embodiments of the present application, a 3GPP network may be an LTE network, or may be a nextgeneration (for example, 4.5G or 5G) network or a future network of another standard. A non-3GPP network may be a WLAN network. Specifically, in the embodiments of the present application, when the 3GPP network is an LTE network, a first network device may be an MME and when the non-3GPP network is a WLAN network, a second network device may be a wireless access point (AP) or an AP controller (AC).

The following clearly describes the technical solutions in the embodiments of the present application with reference to the accompanying drawings in the embodiments of the present application.

Figure 2:
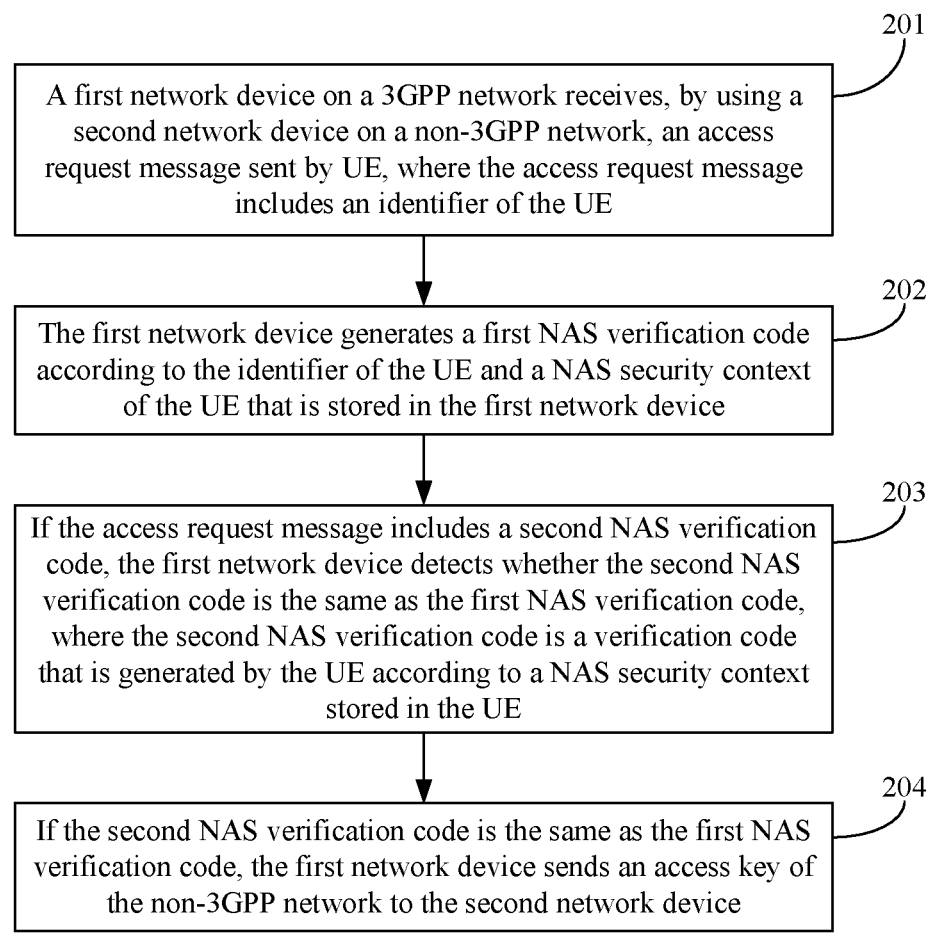
FIG. 2 is a flowchart of an access method of UE according to an embodiment of the present application.

An embodiment of the present application provides an access method of UE. As shown in FIG. 2, the method may be applied to the first network device 011 shown in FIG. 1. The access method of the UE includes the following blocks.

Block 201: A first network device on a 3GPP network receives, by using a second network device on a non-3GPP network, an access request message sent by the UE, where the access request message includes an identifier of the UE.

Block 202: The first network device generates a first NAS verification code based on the identifier of the UE and a NAS security context of the UE that is stored in the first network device.

Block 203: If the access request message includes a second NAS verification code, the first network device detects whether the second NAS verification code is the same as the first NAS verification code, where the second NAS verification code is a verification code that is generated by the UE based on a NAS security context stored in the UE.

Block 204: If the second NAS verification code is the same as the first NAS verification code, the first network device sends an access key of the non-3GPP network to the second network device.

In conclusion, according to the access method of the UE provided in this embodiment of the present application, because the first network device on the 3GPP network can receive, by using the second network device on the non-3GPP network, the access request message sent by the UE, if the access request message includes the second NAS verification code, and the second NAS verification code is the same as the first NAS verification code that is generated by the first network device based on the identifier of the UE and the NAS security context of the UE that is stored in the first network device, the first network device sends the access key of the non-3GPP network to the second network device. Compared with a related technology, in the present application, it is not required that an AAA server performs authentication on the UE, so that a delay caused in an authentication process is reduced. Therefore, an overall communication delay is reduced.

Further, before block 204, the method further includes determining, by the first network device, the access key of the non-3GPP network based on a NAS sequence number of the 3GPP network, a key of the 3GPP network, and a type identifier of the non-3GPP network.

Before the determining, by the first network device, the access key of the non-3GPP network based on a NAS sequence number of the 3GPP network, a key of the 3GPP network, and a type identifier of the non-3GPP network, the method further includes obtaining, by the first network device from the NAS security context of the UE stored in the first network device, the NAS sequence number of the 3GPP network and the key of the 3GPP network and receiving, by the first network device, the type identifier of the non-3GPP network sent by the second network device.

Further, the method further includes: if the second NAS verification code is different from the first NAS verification code, performing, by the first network device, security authentication on the UE; or if the access request message does not include a NAS verification code, performing, by the first network device, security authentication on the UE.

The performing, by the first network device, security authentication on the UE includes sending, by the first network device, an authentication message to the UE by using the second network device and receiving, by the first network device by using the second network device, an authentication response message that is specific to the authentication message and that is sent by the UE.

After the receiving, by the first network device by using the second network device, an authentication response message that is specific to the authentication message and that is sent by the UE, the method further includes sending, by the first network device, an access success message to the UE by using the second network device.

Before block 204, the method further includes obtaining, by the first network device, capability information of the UE, where the capability information is used to indicate a capability of the UE on the non-3GPP network and sending, by the first network device, the capability information to the second network device, where the capability information is used by the second network device to determine a cryptographic algorithm, where the cryptographic algorithm is used by the second network device to generate an AS key of the non-3GPP network.

Optionally, the second network device is an AP.

Optionally, the access request message includes a NAS message, and the NAS message includes the identifier of the UE. The access request message, the authentication message, the authentication response message, and the access success message are carried in an EAP message for transmission.

In conclusion, according to the access method of the UE provided in this embodiment of the present application, because the first network device on the 3GPP network can receive, by using the second network device on the non-3GPP network, the access request message sent by the UE, if the access request message includes the second NAS verification code, and the second NAS verification code is the same as the first NAS verification code that is generated by the first network device based on the identifier of the UE and the NAS security context of the UE that is stored in the first network device, the first network device sends the access key of the non-3GPP network to the second network device. Compared with a related technology, in the present application, it is not required that an AAA server performs authentication on the UE, so that a delay caused in an authentication process is reduced. Therefore, an overall communication delay is reduced.

Figure 3:
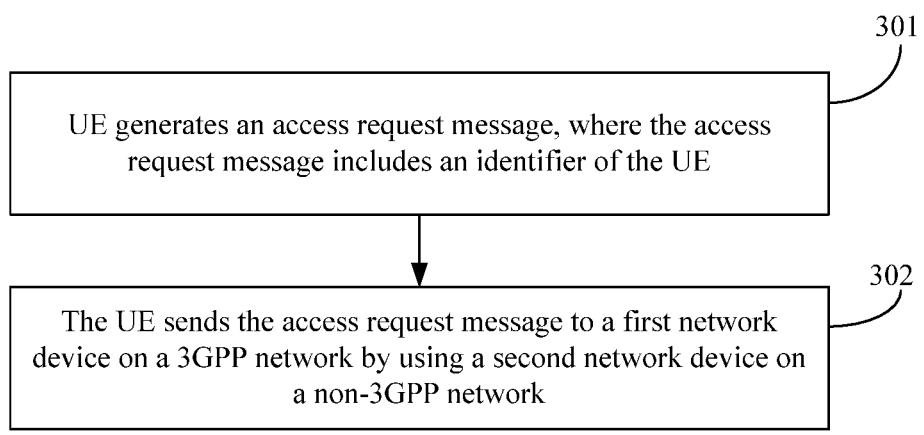
FIG. 3 is a flowchart of another access method of UE according to an embodiment of the present application.

An embodiment of the present application provides an access method of UE. As shown in FIG. 3, the method may be applied to UE 03 shown in FIG. 1. The access method of the UE includes the following blocks.

Block 301: The UE generates an access request message, where the access request message includes an identifier of the UE.

Block 302: The UE sends the access request message to a first network device on a 3GPP network by using a second network device on a non-3GPP network.

In conclusion, according to the access method of the UE provided in this embodiment of the present application, the UE can send the access request message to the first network device on the 3GPP network by using the second network device on the non-3GPP network. Therefore, compared with a related technology, in the present application, it is not required that an AAA server performs authentication on the UE, so that a delay caused in an authentication process is reduced. Therefore, an overall communication delay is reduced.

Further, after block 302, the method further includes determining, by the UE, an access key of the non-3GPP network based on a NAS sequence number of the 3GPP network, a key of the 3GPP network, and a preset type identifier of the non-3GPP network.

Optionally, the access request message includes a second NAS verification code. Before block 301, the method further includes generating, by the UE, the second NAS verification code based on a NAS security context stored in the UE.

After block 302, the method further includes: receiving, by the UE by using the second network device, an authentication message sent by the first network device, where the authentication message is generated by the first network device when the first network device determines that the access request message includes a second NAS verification code and that the second NAS verification code is different from a first NAS verification code or when the access request message does not include a NAS verification code, and the first NAS verification code is a verification code that is generated by the first network device based on the identifier of the UE and a NAS security context of the UE that is stored in the first network device and sending, by the UE by using the second network device, an authentication response message specific to an authentication message to the first network device.

After the sending, by the UE by using the second network device, an authentication response message specific to the authentication message to the first network device, the method further includes receiving, by the UE by using the second network device, an access success message sent by the first network device.

After the determining, by the UE, an access key of the non-3GPP network based on a NAS sequence number of the 3GPP network, a key of the 3GPP network, and a preset type identifier of the non-3GPP network, the method further includes generating, by the UE, an AS key of the non-3GPP network based on the access key of the non-3GPP network.

The generating, by the UE, an AS key of the non-3GPP network based on the access key of the non-3GPP network includes receiving, by the UE, a cryptographic algorithm sent by the second network device and generating, by the UE, the AS key of the non-3GPP network based on the cryptographic algorithm, the access key, and the type identifier of the non-3GPP network.

Optionally, the second network device is an AP.

Optionally, the access request message includes a NAS message, and the NAS message includes the identifier of the UE. The access request message, the authentication message, the authentication response message, and the access success message are carried in an EAP message for transmission.

In conclusion, according to the access method of the UE provided in this embodiment of the present application, the UE can send the access request message to the first network device on the 3GPP network by using the second network device on the non-3GPP network. Therefore, compared with a related technology, in the present application, it is not required that an AAA server performs authentication on the UE, so that a delay caused in an authentication process is reduced. Therefore, an overall communication delay is reduced.

Figures 1A, 4:
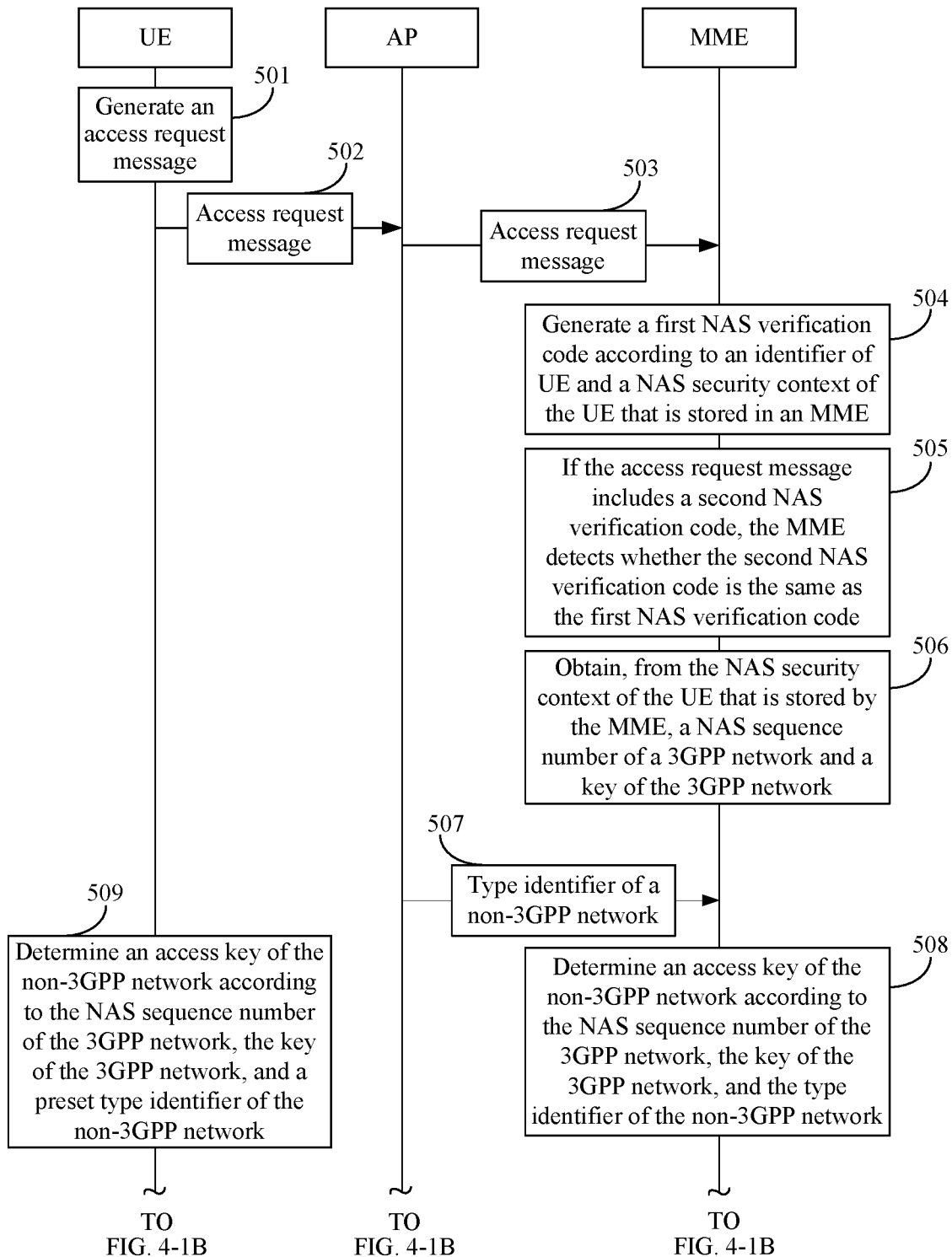
FIG. 4-1A and FIG. 4-1B are a flowchart of another access method of UE according to an embodiment of the present application.
Figures 1B, 4:
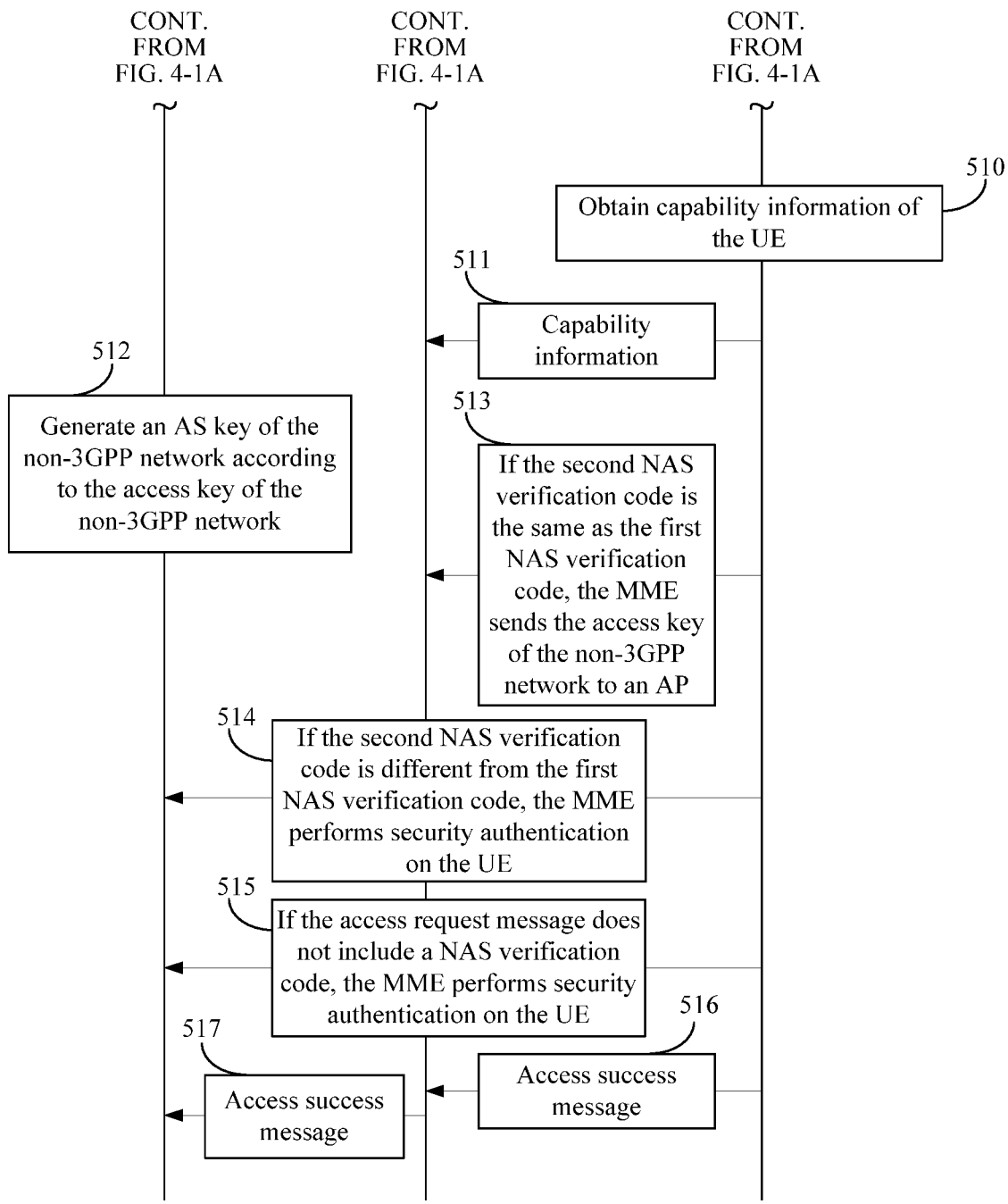
Figures 2, 4:
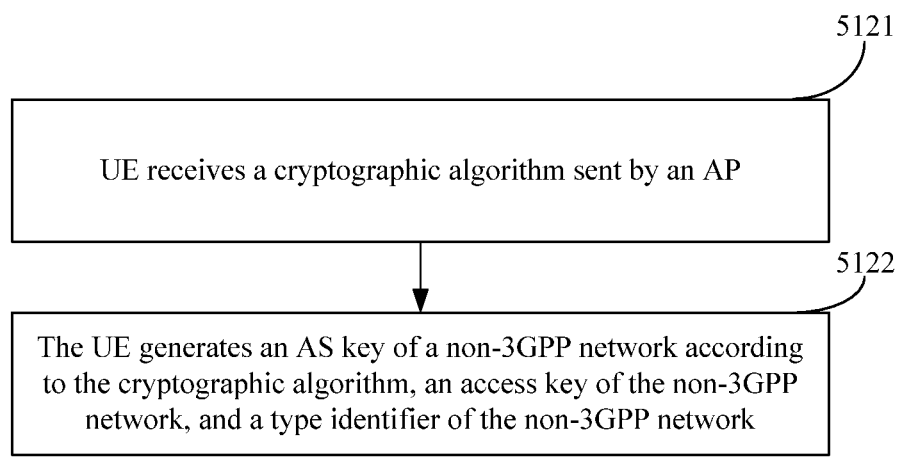
Figures 3, 4:
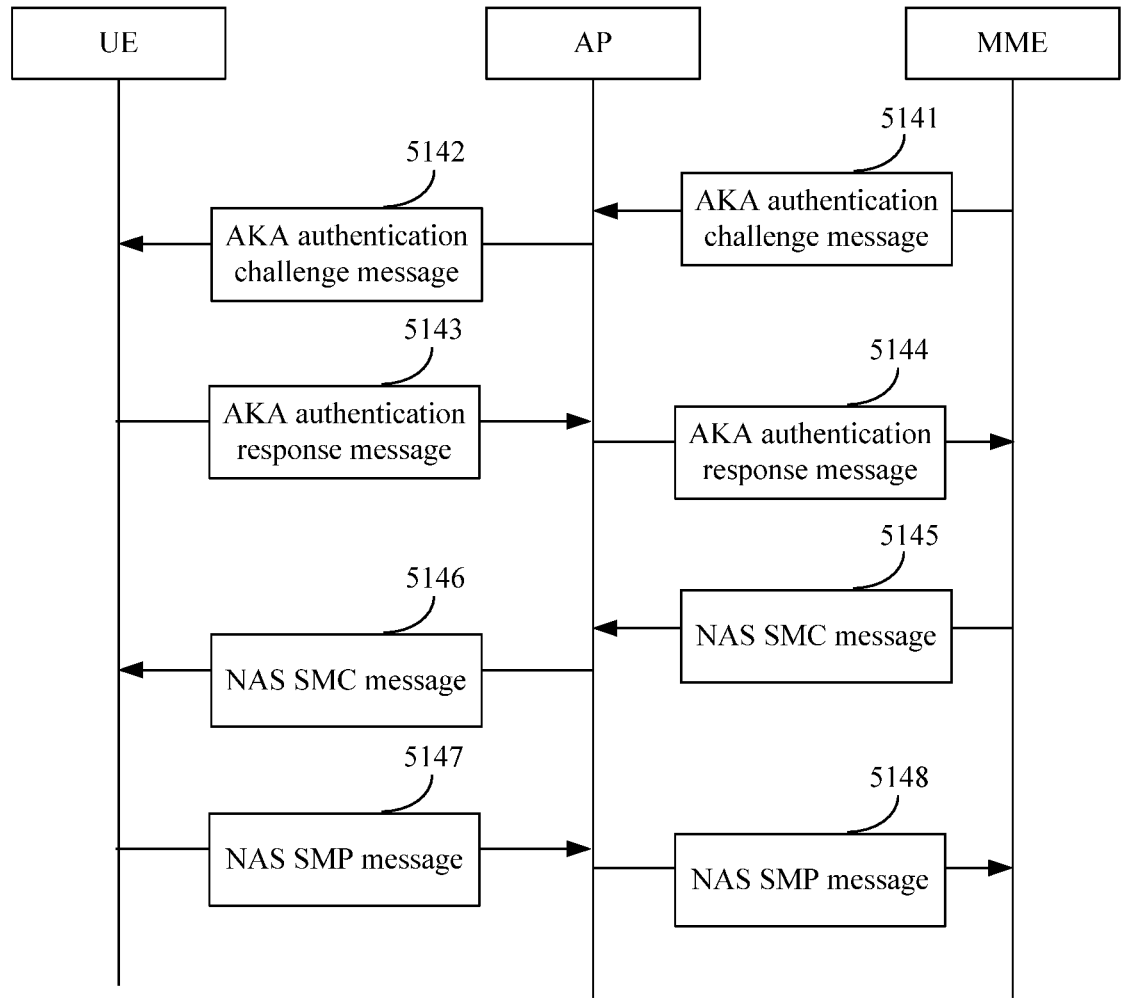

In an embodiment of the present application, an example in which a 3GPP network is an LTE network and a non-3GPP network is a WLAN network is used for description. In this case, a first network device may be an MME, and a second network device may be an AP. This embodiment of the present application provides an access method of UE. As shown in FIG. 4-1A and FIG. 4B, the access method of the UE includes the following blocks.

Block 501: The UE generates an access request message.

The access request message includes an identifier of the UE. Optionally, the access request message includes a NAS message, and the NAS message may include the identifier of the UE. The access request message is carried in an EAP message for transmission.

Block 502: The UE sends the access request message to an AP.

The UE sends, to the AP, the EAP message that carries the access request message, so that the AP sends, to an MME, the EAP message that carries the access request message.

Block 503: The AP sends the access request message to an MME.

After receiving the EAP message that carries the access request message and that is sent by the UE, the AP sends, to the MME, the EAP message that carries the access request message.

Block 504: The MME generates a first NAS verification code based on an identifier of the UE and a NAS security context of the UE that is stored in the MME.

A 3GPP network is divided into two parts: an access network and a core network. When the UE accesses the core network of the 3GPP network by using the access network of the 3GPP network, a network device that is responsible for mobility management and other functions and that is on the core network of the 3GPP network, such as the MME, performs EPS-AKA authentication on the UE. For a procedure of EPS AKA, refer to the 3GPP TS 33.401 protocol. In the protocol, a challenge response mechanism is used to implement identity authentication and key agreement between a user and a network and perform negotiation on a communications encryption key based on identity authentication. Specifically, the MME obtains an authentication vector {RAND, AUTN, XRES, Kasme} from a home subscription server (HSS), where the RAND is a random number, the AUTN is an authentication token, the XRES is an expected response, and the Kasme is a network key. The MME sends the RAND and the AUTN to the UE and the UE checks whether the AUTN is correct. If the AUTN is correct, the UE calculates a response (RES) based on the RAND, and sends the RES to the MME. The MME checks whether the RES sent by the UE is the same as the expected response (XRES) in the authentication vector. If the RES sent by the UE is the same as the XRES in the authentication vector, authentication performed on the UE by the MME succeeds. After the authentication succeeds, the UE and the MME share a set of NAS security context. Both the MME and the UE store the NAS security context. The NAS security context refers to a set of security related parameters.

In this embodiment of the present application, the NAS security context includes Kasme, Knas.int (integrity protection key) or Knas.enc (decryption key), a NAS algorithm, a NAS sequence number, capability information of the UE, and the like. The Kasme is a key of the 3GPP network. The Knas.int is used to protect integrity of a NAS message between the UE and the MME. The Knas.enc is used to protect confidentiality of the NAS message between the UE and the MME. The NAS sequence number may be an uplink NAS sequence number or a downlink NAS sequence number.

Because the MME is responsible for performing mobility management of multiple UEs, NAS security contexts of the multiple UEs are stored on the MME, and each UE is corresponding to one identifier. Therefore, the MME may determine, based on the identifier of the UE, a NAS security context corresponding to the UE, and then generate a NAS verification code based on the NAS security context. The NAS verification code is a first NAS verification code. Specifically, the first NAS verification code may be generated based on the key or the NAS algorithm of the 3GPP network in the NAS security context. For the process, reference may be made to a related technology. Details are not described in this embodiment of the present application.

Block 505: If the access request message includes a second NAS verification code, the MME detects whether the second NAS verification code is the same as the first NAS verification code.

The second NAS verification code is a verification code that is generated by the UE based on a NAS security context stored in the UE. In block 501, when generating the access request message, the UE may generate a NAS verification code based on the NAS security context that is stored in the UE, where the NAS verification code is the second NAS verification code. Specifically, the second NAS verification code may be generated based on the key or the NAS algorithm of the 3GPP network in the NAS security context.

It should be noted that, if the access request message includes the second NAS verification code, before block 501 of generating, by the UE, an access request message, the method may further include generating, by the UE, the second NAS verification code based on the NAS security context stored in the UE.

Block 506: The MME obtains, from the NAS security context of the UE that is stored in the MME, a NAS sequence number of a 3GPP network and a key of the 3GPP network.

The NAS security context of the UE that is stored in the MME includes the key and the NAS sequence number of the 3GPP network. Therefore, the MME can directly obtain, from the NAS security context, the NAS sequence number of the 3GPP network and the key of the 3GPP network.

Block 507: The MME receives a type identifier of a non-3GPP network that is sent by the AP.

The type identifier of the non-3GPP network may be carried in the access request message in block 503, and is sent by the AP to the MME. Alternatively, the type identifier of the non-3GPP network may be carried in an AKA authentication response message in block 5144, and is sent by the AP to the MME.

In block 503, when sending the access request message to the MME, the AP may add the type identifier of the non-3GPP network or an identity identifier of the non-3GPP network to the access request message. The type identifier of the non-3GPP network is used to indicate a type of the non-3GPP network, for example, a WLAN type. The identity identifier of the non-3GPP network is used to uniquely identify an identity of the non-3GPP network. After receiving the access request message that is sent by the AP, the MME may obtain, from the access request message, the type identifier of the non-3GPP network or the identity identifier of the non-3GPP network. If obtaining the identity identifier of the non-3GPP network, the MME may determine the type identifier of the non-3GPP network based on the identity identifier of the non-3GPP network. In this embodiment of the present application, the type identifier of the non-3GPP network or the identity identifier of the non-3GPP network is carried in the access request message, and there is no need to generate a new message. This can reduce a quantity of messages, and reduce network load.

If the second NAS verification code is different from the first NAS verification code, or if the access request message does not include a NAS verification code, the MME may perform security authentication on the UE. In a process in which the MME performs security authentication on the UE, the type identifier of the non-3GPP network or an identity identifier of the non-3GPP network may be added to the AKA authentication response message that is sent by the AP to the MME, and the MME may obtain, from the AKA authentication response message, the type identifier of the non-3GPP network or the identity identifier of the non-3GPP network. If obtaining the identity identifier of the non-3GPP network, the MME may determine the type identifier of the non-3GPP network based on the identity identifier of the non-3GPP network. Similarly, in this embodiment of the present application, the type identifier of the non-3GPP network or the identity identifier of the non-3GPP network is carried in the AKA authentication response message, and there is no need to generate a new message. This can reduce a quantity of messages, and reduce network load.

Block 508: The MME determines an access key of the non-3GPP network based on the NAS sequence number of the 3GPP network, the key of the 3GPP network, and the type identifier of the non-3GPP network.

Specifically, the MME determines the access key based on the NAS sequence number of the 3GPP network, the key of the 3GPP network, and the type identifier of the non-3GPP network by using a preset key deduction algorithm. The NAS sequence number is an uplink NAS sequence number. For example, the MME may determine, by using the preset key deduction algorithm, the access key of the non-3GPP network based on the NAS sequence number of the 3GPP network and the key of the 3GPP network that are obtained in block 506 and the type identifier of the non-3GPP network that is received in block 507. A calculation formula of the access key of the non-3GPP network is as follows:

$$K = KDF(\text{uplink NAS count}, K_{asme}, \text{``WLAN''}), \text{ where}$$

K is the access key of the non-3GPP network, that is, a WLAN network, "uplink NAS count" is the uplink NAS sequence number, Kasme is the key of the 3GPP network, "WLAN" is the type identifier of the non-3GPP network, and KDF indicates the preset key deduction algorithm. It should be noted that, in the deduction process of the access key K of the non-3GPP network, in addition to parameters such as "uplink NAS count" and "Kasme", another parameter may also be included.

Block 509: The UE determines an access key of the non-3GPP network based on the NAS sequence number of the 3GPP network, the key of the 3GPP network, and a preset type identifier of the non-3GPP network.

Similarly, the UE also determines the access key of the non-3GPP network based on the NAS sequence number of the 3GPP network, the key of the 3GPP network, and the preset type identifier of the non-3GPP network by using a preset key deduction algorithm. Specifically, the UE obtains, from the stored NAS security context, the NAS sequence number of the 3GPP network and the key Kasme of the 3GPP network. The NAS sequence number is an uplink NAS sequence number. The UE stores the type identifier of the non-3GPP network. Therefore, the UE may determine the access key of the non-3GPP network. A calculation formula of the access key is as follows:

$$K=KDF(\text{uplink NAS count}, Kasme, \text{"WLAN"}), \text{ where}$$

K is the access key of the non-3GPP network, "uplink NAS count" is the uplink NAS sequence number, Kasme is the key of the 3GPP network, "WLAN" is the type identifier of the non-3GPP network, and KDF indicates the preset key deduction algorithm. It should be noted that, the preset key deduction algorithm is the same as the preset key deduction algorithm used in block 508.

Block 510: The MME obtains capability information of the UE.

The capability information is used to indicate a capability of the UE on the non-3GPP network. The capability information of the UE is included in the NAS security context of the UE stored in the MME. Therefore, the MME may obtain the capability information of the UE from the NAS security context.

Block 511: The MME sends the capability information to the AP.

After obtaining the capability information of the UE, the MME sends the capability information to the AP, so that the AP determines a cryptographic algorithm based on the capability information. The cryptographic algorithm is used by the AP to generate an AS key of the non-3GPP network. Specifically, the AP locally stores an algorithm list. The algorithm list records various cryptographic algorithms that are supported by the non-3GPP network, and these cryptographic algorithms are arranged in ascending or descending order of priorities. When obtaining the cryptographic algorithm of the non-3GPP network, the AP may match the capability of the UE on the non-3GPP network with the algorithm list, to obtain cryptographic algorithms that are corresponding to the capability of the UE on the non-3GPP network and that are in the algorithm list, and then obtain an algorithm with a highest priority among these algorithms as the selected cryptographic algorithm of the non-3GPP network. For example, a network device in a WLAN network supports a cryptographic algorithm AES (the AES is a $21^{st}$ century encryption standard with which the National Institute of Standards and Technology NIST intends to replace the DES).

The non-3GPP network is a WLAN network. Assuming that capabilities of the UE on the WLAN network received by the AP are corresponding to L1 and L5, and that an algorithm list of the WLAN network is shown in Table 1, cryptographic algorithms in Table 1 are arranged in descending order of priorities and are algorithms L1, L4, L5, and L2 sequentially, the AP matches the capability of the UE on the WLAN network with the algorithm list of the WLAN network, to obtain cryptographic algorithms L1 and L5 that are corresponding to the capability of the UE on the WLAN network and that are in the algorithm list supported by the WLAN network, obtains the algorithm L1 with a higher priority between the algorithms according to Table 1, and may determine L1 as a final cryptographic algorithm.

TABLE 1

| Network type | Algorithm |
| --- | --- |
| WLAN | L1 |
|  | L4 |
|  | L5 |
|  | L2 |

Block 512: The UE generates an AS key of the non-3GPP network based on the access key of the non-3GPP network.

Specifically, as shown in FIG. 4-2, block 512 includes the following blocks.

Block 5121: The UE receives a cryptographic algorithm sent by the AP.

The UE may obtain the cryptographic algorithm by using the AP. The cryptographic algorithm is the cryptographic algorithm determined by the AP in block 511. When the AP sends a message to the UE, a cryptographic algorithm corresponding to the UE may be indicated in the message, so that the UE obtains the cryptographic algorithm, and generates the AS key of the non-3GPP network based on the cryptographic algorithm, the access key of the non-3GPP network, and the type identifier of the non-3GPP network. It should be noted that, the cryptographic algorithm may be carried in an access success message in block 517 and sent by the AP to the UE; or may be carried in a four-way handshake message and sent by the AP to the UE; or may be carried in another message. This is not limited in this embodiment of the present application.

Block 5122: The UE generates the AS key of the non-3GPP network based on the cryptographic algorithm, the access key of the non-3GPP network, and the type identifier of the non-3GPP network.

The UE generates the AS key of the non-3GPP network based on the cryptographic algorithm sent by the AP, the access key of the non-3GPP network that is determined by the UE, and the type identifier of the non-3GPP network. A calculation formula of the AS key of the non-3GPP network is as follows:

$$PMK=KDF(K, L1, \text{"WLAN"}), \text{ where}$$

PMK is the AS key of the non-3GPP network, K is the access key of the non-3GPP network, L1 is an algorithm identifier corresponding to the cryptographic algorithm that is determined based on the capability information of the UE, "WLAN" is the type identifier of the non-3GPP network, and KDF indicates using an algorithm corresponding to L1.

Block 513: If the second NAS verification code is the same as the first NAS verification code, the MME sends the access key of the non-3GPP network to the AP.

If the second NAS verification code that is generated by the UE based on the NAS security context stored in the UE is the same as the first NAS verification code that is generated by the MME based on the identifier of the UE and the NAS security context of the UE that is stored in the MME, the MME sends the access key of the non-3GPP network to the AP.

On one hand, after the AP receives the access key of the non-3GPP network that is sent by the MME, because the UE also determines the access key of the non-3GPP network based on the NAS sequence number of the 3GPP network, the key of the 3GPP network, and the preset type identifier of the non-3GPP network in block 509, the AP may communicate with the UE, and the AP and the UE may perform air interface security activation based on the determined access key of the non-3GPP network.

On the other hand, after the AP receives the access key of the non-3GPP network that is sent by the MME, the AP can generate the AS key of the non-3GPP network based on the access key of the non-3GPP network, the cryptographic algorithm determined by the AP, and the type identifier of the non-3GPP network. Because the UE also generates the AS key of the non-3GPP network based on the access key of the non-3GPP network in block 512, after both the UE and the AP generate the AS key of the non-3GPP network, the UE and the AP may implement a process of air interface security activation by using the generated AS key of the non-3GPP network, to complete negotiation and activation of an AS security context, and implement a four-way handshake (4-way handshake) procedure on the WLAN network. A calculation formula of the AS key is as follows:

PMK=KDF(K,L1,"WLAN"), where

PMK is the AS key of the non-3GPP network, K is the access key of the non-3GPP network, L1 is an algorithm identifier corresponding to the cryptographic algorithm that is determined based on the capability information of the UE, "WLAN" is the type identifier of the non-3GPP network, and KDF indicates using an algorithm corresponding to L1.

Block 514: If the second NAS verification code is different from the first NAS verification code, the MME performs security authentication on the UE.

The performing, by the MME, security authentication on the UE may include: sending, by the MME, an authentication message to the UE by using the AP and receiving, by the MME by using the AP, an authentication response message that is specific to the authentication message and that is sent by the UE. The authentication message may include an AKA authentication challenge message and a NAS security mode command (English: Security Mode Command, SMC for short) message. The authentication response message specific to the authentication message may include an AKA authentication response message and a NAS security mode complete (English: security mode complete, SMP for short) message. Therefore, as shown in FIG. 4-3, the performing, by the MME, security authentication on the UE may specifically include the following blocks:

Block 5141: The MME sends an AKA authentication challenge message to the AP.

The MME sends, to the AP, the EAP message that carries the AKA authentication challenge message.

Block 5142: The AP sends the AKA authentication challenge message to the UE.

The AP sends, to the UE, the EAP message that carries the AKA authentication challenge message.

Block 5143: The UE sends an AKA authentication response message to the AP.

The UE sends, to the AP, the EAP message that carries the AKA authentication response message.

Block 5144: The AP sends the AKA authentication response message to the MME.

The AP sends, to the MME, the EAP message that carries the AKA authentication response message.

Block 5145: The MME sends a NAS SMC message to the AP.

The MME sends, to the AP, the EAP message that carries the NAS SMC message.

Block 5146: The AP sends the NAS SMC message to the UE.

The AP sends, to the UE, the EAP message that carries the NAS SMC message.

Block 5147: The UE sends a NAS SMP message to the AP.

The UE sends, to the AP, the EAP message that carries the NAS SMP message.

Block 5148: The AP sends the NAS SMP message to the MME.

The AP sends, to the MME, the EAP message that carries the NAS SMP message.

If the second NAS verification code is different from the first NAS verification code, after the MME performs security authentication on the UE, the MME sends the access key of the non-3GPP network to the AP.

Block 515: If the access request message does not include a NAS verification code, the MME performs security authentication on the UE.

The performing, by the MME, security authentication on the UE may include: sending, by the MME, an authentication message to the UE by using the AP and receiving, by the MME by using the AP, an authentication response message that is specific to the authentication message and that is sent by the UE. For a specific process in which the MME performs security authentication on the UE, reference may be made to description of block 514. Details are not described herein again.

If the access request message does not include a NAS verification code, after the MME performs security authentication on the UE, the MME sends the access key of the non-3GPP network to the AP.

Block 516: The MME sends an access success message to the AP.

It should be noted that, if the second NAS verification code is the same as the first NAS verification code, the MME may send, to the UE by using the AP, the EAP message that carries the access success message. If the second NAS verification code is different from the first NAS verification code, or if the access request message does not include a NAS verification code, after the MME performs security authentication on the UE, the MME may also send, to the UE by using the AP, the EAP message that carries the access success message.

Block 517: The AP sends the access success message to the UE.

After the MME sends the access success message to the UE by using the AP, the MME sends the access key of the non-3GPP network to the AP.

According to the access method of the UE provided in this embodiment of the present application, an access delay of an inter-system air interface is effectively reduced, an authentication path is simplified, and user experience is improved. A security context between the UE and the non-3GPP network is created by using the NAS security context between the UE and the 3GPP network. In some scenarios, the UE may be located only in a coverage area of the non-3GPP network. Therefore, in the access method of the UE, a NAS message exchanged between the UE and a first network device on the 3GPP network is encapsulated into an EAP message for transmission, so as to complete a security context creation process. The access method of the UE is based on an existing 3GPP network security architecture, and authentication performed on the UE by the first network device on the 3GPP network is completed by using an existing EPS AKA authentication procedure. In the access method of the UE, an existing AS security mechanism is reused fully, without needing to modify an air interface security activation process by using an AS of the non-3GPP network.

Particularly, a sequence of the blocks of the access method of the UE provided in this embodiment of the present application may be appropriately adjusted, and a block may be added or deleted in a specific case. For example, block 508 and block 509 may be performed at the same time. For another example, the type identifier of the non-3GPP network in block 507 may be carried in the access request message in block 503, or may be carried in the AKA authentication response message in block 5144. Therefore, block 507 and block 503 may be performed at the same time, or block 507 and block 5144 may be performed at the same time. The sequence of the blocks of the access method of the UE is not limited in this embodiment of the present application. Any modified method readily figured out by a person skilled in the art within the technical scope disclosed in the present application shall fall within the protection scope of the present application. Therefore, details are not described.

In conclusion, according to the access method of the UE provided in this embodiment of the present application, because the first network device on the 3GPP network can receive, by using the second network device on the non-3GPP network, the access request message sent by the UE, if the access request message includes the second NAS verification code, and the second NAS verification code is the same as the first NAS verification code that is generated by the first network device based on the identifier of the UE and the NAS security context of the UE that is stored in the first network device, the first network device sends the access key of the non-3GPP network to the second network device. Compared with a related technology, in the present application, it is not required that an AAA server performs authentication on the UE, so that a delay caused in an authentication process is reduced. Therefore, an overall communication delay is reduced.

Figure 5:
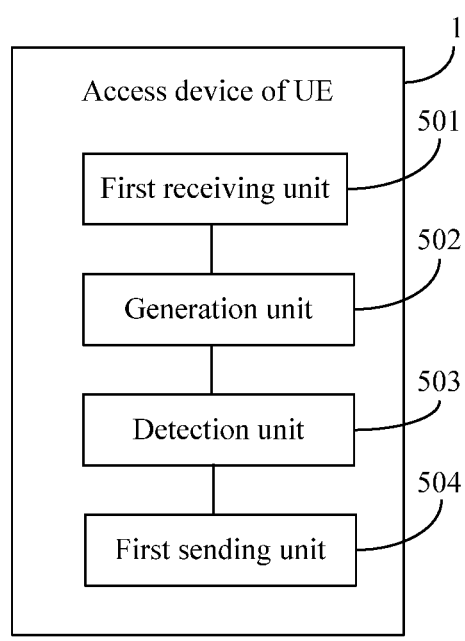
FIG. 5 is a schematic structural diagram of an access device of UE according to an embodiment of the present application.

An embodiment of the present application provides an access device 1 of UE. The access device 1 of the UE is located on a 3GPP network, and the access device 1 of the UE may be a first network device on the 3GPP network. As shown in FIG. 5, the access device 1 of the UE includes:

a first receiving unit 501, configured to receive, by using a second network device on a non-3GPP network, an access request message sent by the UE, where the access request message includes an identifier of the UE;

a generation unit 502, configured to generate a first NAS verification code based on the identifier of the UE and a NAS security context of the UE that is stored in the access device of the UE; and a detection unit 503, configured to: when the access request message includes a second NAS verification code, detect whether the second NAS verification code is the same as the first NAS verification code, where the second NAS verification code is a verification code that is generated by the UE based on a NAS security context stored in the UE; and a first sending unit 504, configured to: when the second NAS verification code is the same as the first NAS verification code, send an access key of the non-3GPP network to the second network device.

In conclusion, according to the access device of the UE provided in this embodiment of the present application, because the first receiving unit can receive, by using the second network device on the non-3GPP network, the access request message sent by the UE, if the access request message includes the second NAS verification code, and the second NAS verification code is the same as the first NAS verification code that is generated by the first network device based on the identifier of the UE and the NAS security context of the UE that is stored in the first network device, the first sending unit sends the access key of the non-3GPP network to the second network device. Compared with a related technology, in the present application, it is not required that an AAA server performs authentication on the UE, so that a delay caused in an authentication process is reduced. Therefore, an overall communication delay is reduced.

Figures 1, 6:
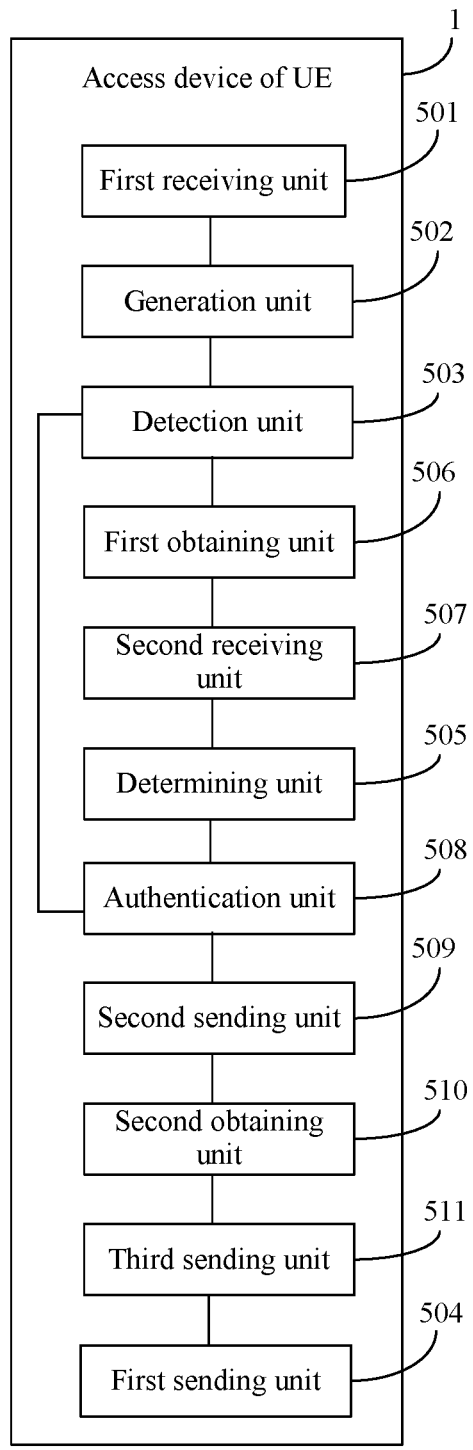
Figures 2, 6:
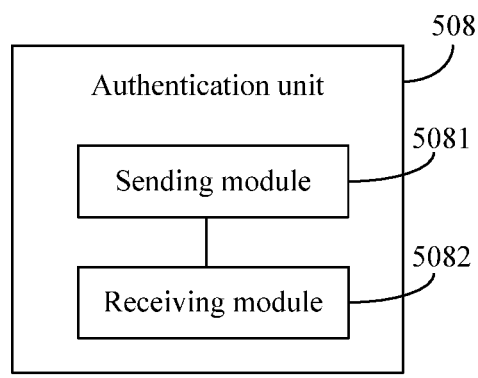

An embodiment of the present application provides an access device 1 of UE. The access device 1 of the UE is located on a 3GPP network, and the access device of the UE may be a first network device on the 3GPP network. As shown in FIG. 6-1, the access device 1 of the UE includes:

a first receiving unit 501, configured to receive, by using a second network device on a non-3GPP network, an access request message sent by the UE, where the access request message includes an identifier of the UE;

a generation unit 502, configured to generate a first NAS verification code based on the identifier of the UE and a NAS security context of the UE that is stored in the access device of the UE; and a detection unit 503, configured to: when the access request message includes a second NAS verification code, detect whether the second NAS verification code is the same as the first NAS verification code, where the second NAS verification code is a verification code that is generated by the UE based on a NAS security context stored in the UE; and a first sending unit 504, configured to: when the second NAS verification code is the same as the first NAS verification code, send an access key of the non-3GPP network to the second network device;

a determining unit 505, configured to determine the access key of the non-3GPP network based on a NAS sequence number of the 3GPP network, a key of the 3GPP network, and a type identifier of the non-3GPP network;

a first obtaining unit 506, configured to obtain, from the NAS security context of the UE stored in the access device of the UE, the NAS sequence number of the 3GPP network and the key of the 3GPP network;

a second receiving unit 507, configured to receive the type identifier of the non-3GPP network sent by the second network device;

an authentication unit 508, configured to: when the second NAS verification code is different from the first NAS verification code, perform security authentication on the UE; or when the access request message does not include a NAS verification code, perform security authentication on the UE;

a second sending unit 509, configured to send an access success message to the UE by using the second network device;

a second obtaining unit 510, configured to obtain capability information of the UE, where the capability information is used to indicate a capability of the UE on the non-3GPP network; and a third sending unit 511, configured to send the capability information to the second network device, where the capability information is used by the second network device to determine a cryptographic algorithm, and the cryptographic algorithm is used by the second network device to generate an AS key of the non-3GPP network.

As shown in FIG. 6-2, the authentication unit 508 includes:

a sending module 5081, configured to send an authentication message to the UE by using the second network device; and a receiving module 5082, configured to receive, by using the second network device, an authentication response message that is specific to the authentication message and that is sent by the UE.

Optionally, the second network device is an AP.

In conclusion, according to the access device of the UE provided in this embodiment of the present application, because the first receiving unit can receive, by using the second network device on the non-3GPP network, the access request message sent by the UE, if the access request message includes the second NAS verification code, and the second NAS verification code is the same as the first NAS verification code that is generated by the first network device based on the identifier of the UE and the NAS security context of the UE that is stored in the first network device, the first sending unit sends the access key of the non-3GPP network to the second network device. Compared with a related technology, in the present application, it is not required that an AAA server performs authentication on the UE, so that a delay caused in an authentication process is reduced. Therefore, an overall communication delay is reduced.

Figure 7:
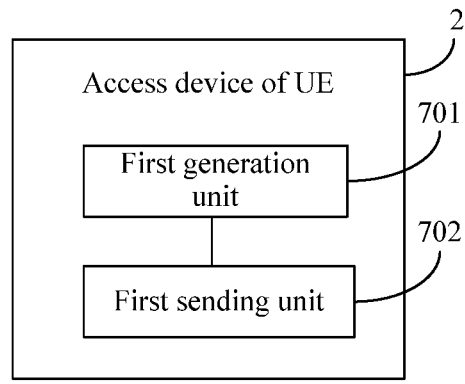
FIG. 7 is a schematic structural diagram of another access device of UE according to an embodiment of the present application.

An embodiment of the present application provides an access device 2 of UE. The access device 2 of the UE is located on a non-3GPP network, and the access device 2 of the UE may be the UE. As shown in FIG. 7, the access device 2 of the UE includes:

a first generation unit 701, configured to generate an access request message, where the access request message includes an identifier of the access device of the UE; and a first sending unit 702, configured to send the access request message to a first network device on a 3GPP network by using a second network device on the non-3GPP network.

In conclusion, according to the access device of the UE provided in this embodiment of the present application, the first sending unit can send the access request message to the first network device on the 3GPP network by using the second network device on the non-3GPP network. Therefore, compared with a related technology, in the present application, it is not required that an AAA server performs authentication on the UE, so that a delay caused in an authentication process is reduced. Therefore, an overall communication delay is reduced.

Figures 1, 8:
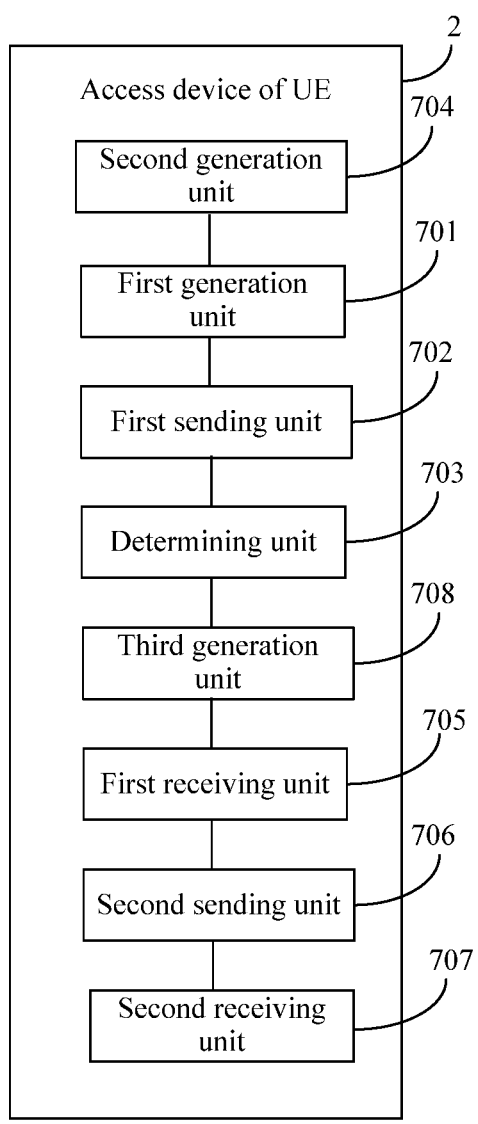
Figures 2, 8:
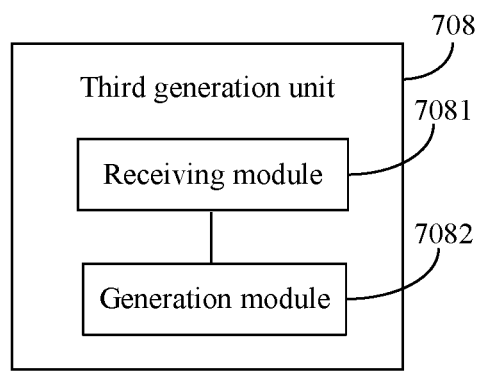

An embodiment of the present application provides an access device 2 of UE. The access device 2 of the UE is located on a non-3GPP network, and the access device 2 of the UE may be the UE. As shown in FIG. 8-1, the access device 2 of the UE includes:

a first generation unit 701, configured to generate an access request message, where the access request message includes an identifier of the access device of the UE;

a first sending unit 702, configured to send the access request message to a first network device on a 3GPP network by using a second network device on the non-3GPP network;

a determining unit 703, configured to determine an access key of the non-3GPP network based on a NAS sequence number of the 3GPP network, a key of the 3GPP network, and a preset type identifier of the non-3GPP network;

a second generation unit 704, configured to generate a second NAS verification code based on a NAS security context stored in the access device of the UE;

a first receiving unit 705, configured to receive, by using the second network device, an authentication message sent by the first network device, where the authentication message is generated by the first network device when the first network device determines that the access request message includes a second NAS verification code and that the second NAS verification code is different from a first NAS verification code or when the access request message does not include a NAS verification code, and the first NAS verification code is a verification code that is generated by the first network device based on the identifier of the access device of the UE and a NAS security context of the access device of the UE stored in the first network device;

a second sending unit 706, configured to send, by using the second network device, an authentication response message specific to the authentication message to the first network device;

a second receiving unit 707, configured to receive, for the access device of the UE by using the second network device, an access success message sent by the first network device; and a third generation unit 708, configured to generate an AS key of the non-3GPP network based on the access key of the non-3GPP network.

As shown in FIG. 8-2, the third generation unit 708 includes:

a receiving module 7081, configured to receive a cryptographic algorithm sent by the second network device; and a generation module 7082, configured to generate the AS key of the non-3GPP network based on the cryptographic algorithm, the access key of the non-3GPP network, and the type identifier of the non-3GPP network.

Optionally, the second network device is an AP.

In conclusion, according to the access device of the UE provided in this embodiment of the present application, the first sending unit can send the access request message to the first network device on the 3GPP network by using the second network device on the non-3GPP network. Therefore, compared with a related technology, in the present application, it is not required that an AAA server performs authentication on the UE, so that a delay caused in an authentication process is reduced. Therefore, an overall communication delay is reduced.

Figure 9:
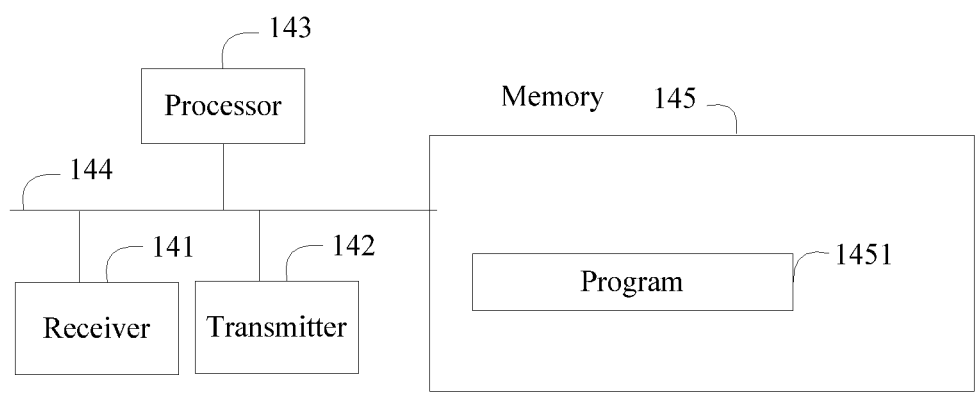
FIG. 9 is a schematic structural diagram of another access device of UE according to an embodiment of the present application.

An embodiment of the present application provides an access device 3 of UE. The access device 3 of the UE is located on a 3GPP network, and the access device 3 of the UE may be a first network device on the 3GPP network. As shown in FIG. 9, the access device 3 of the UE includes: a receiver 141, a transmitter 142, a processor 143 (such as a CPU), a bus 144, and a memory 145. The bus 144 is configured to connect the receiver 141, the transmitter 142, the processor 143, and the memory 145. The processor 143 is configured to execute a program 1451 stored in the memory 145. The memory 145 may include a high-speed random access memory (RAM), or may further include a non-volatile memory (non-volatile memory), such as at least one magnetic disk memory.

The receiver 141 is configured to receive, by using a second network device on a non-3GPP network, an access request message sent by the UE, where the access request message includes an identifier of the UE.

The processor 143 is configured to generate a first NAS verification code based on the identifier of the UE and a NAS security context of the UE that is stored in the access device of the UE.

The processor 143 is further configured to: when the access request message includes a second NAS verification code, detect whether the second NAS verification code is the same as the first NAS verification code, where the second NAS verification code is a verification code that is generated by the UE based on a NAS security context stored in the UE.

The transmitter 142 is configured to: when the second NAS verification code is the same as the first NAS verification code, send an access key of the non-3GPP network to the second network device.

In conclusion, according to the access device of the UE provided in this embodiment of the present application, because the receiver can receive, by using the second network device on the non-3GPP network, the access request message sent by the UE, if the access request message includes the second NAS verification code, and the second NAS verification code is the same as the first NAS verification code that is generated by the access device of the UE based on the identifier of the UE and the NAS security context of the UE stored in the access device of the UE, the transmitter sends the access key of the non-3GPP network to the second network device. Compared with a related technology, in the present application, it is not required that an AAA server performs authentication on the UE, so that a delay caused in an authentication process is reduced. Therefore, an overall communication delay is reduced.

Optionally, the processor 143 is further configured to: determine the access key of the non-3GPP network based on a NAS sequence number of the 3GPP network, a key of the 3GPP network, and a type identifier of the non-3GPP network.

The processor 143 is further configured to obtain, from the NAS security context of the UE stored in the access device of the UE, the NAS sequence number of the 3GPP network and the key of the 3GPP network.

The receiver 141 is further configured to receive the type identifier of the non-3GPP network sent by the second network device.

The processor 143 is further configured to: when the second NAS verification code is different from the first NAS verification code, perform security authentication on the UE; or when the access request message does not include a NAS verification code, perform security authentication on the UE.

The processor 143 is specifically configured to: send an authentication message to the UE by using the second network device and receive, by using the second network device, an authentication response message that is specific to the authentication message and that is sent by the UE.

The transmitter 142 is further configured to send an access success message to the UE by using the second network device.

The processor 143 is further configured to obtain capability information of the UE, where the capability information is used to indicate a capability of the UE on the non-3GPP network.

The transmitter 142 is further configured to send the capability information to the second network device, where the capability information is used by the second network device to determine a cryptographic algorithm, and the cryptographic algorithm is used by the second network device to generate an AS key of the non-3GPP network.

Optionally, the second network device is an AP.

In conclusion, according to the access device of the UE provided in this embodiment of the present application, because the receiver can receive, by using the second network device on the non-3GPP network, the access request message sent by the UE, if the access request message includes the second NAS verification code, and the second NAS verification code is the same as the first NAS verification code that is generated by the access device of the UE based on the identifier of the UE and the NAS security context of the UE stored in the access device of the UE, the transmitter sends the access key of the non-3GPP network to the second network device. Compared with a related technology, in the present application, it is not required that an AAA server performs authentication on the UE, so that a delay caused in an authentication process is reduced. Therefore, an overall communication delay is reduced.

Figures 1, 10:
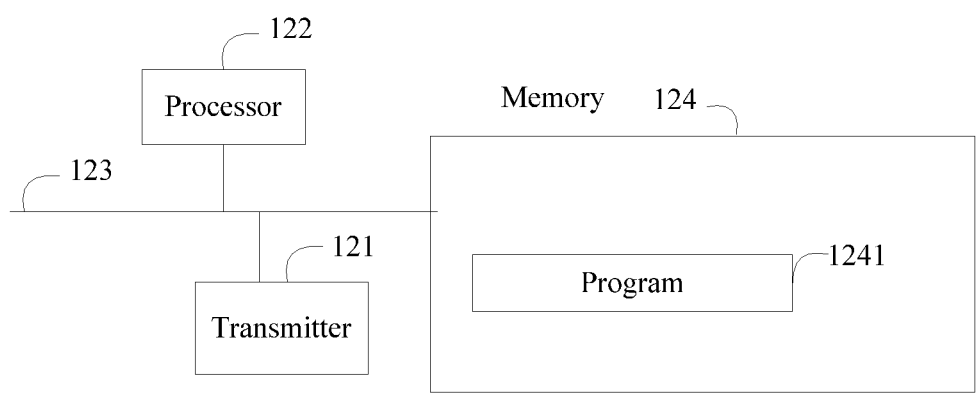
Figures 2, 10:
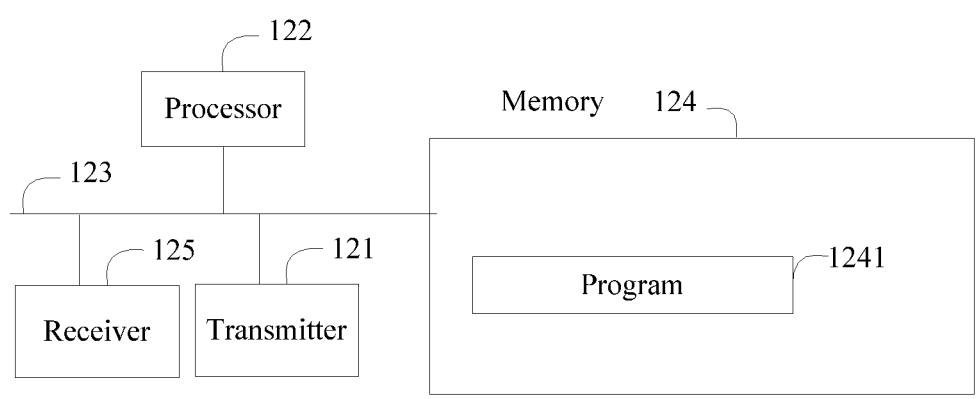

An embodiment of the present application provides an access device 4 of UE. The access device 4 of the UE is located on a non-3GPP network, and the access device 4 of the UE may be the UE. As shown in FIG. 10-1, the access device 4 of the UE includes: a transmitter 121, a processor 122, a bus 123, and a memory 124. The bus 123 is configured to connect the transmitter 121, the processor 122, and the memory 124. The processor 122 is configured to execute a program 1241 stored in the memory 124.

The processor 122 is configured to generate an access request message, where the access request message includes an identifier of the access device of the UE.

The transmitter 121 is configured to send the access request message to a first network device on a 3rd Generation Partnership Project 3GPP network by using a second network device on the non-3GPP network.

In conclusion, according to the access device of the UE provided in this embodiment of the present application, the transmitter can send the access request message to the first network device on the 3GPP network by using the second network device on the non-3GPP network. Therefore, compared with a related technology, in the present application, it is not required that an AAA server performs authentication on the UE, so that a delay caused in an authentication process is reduced. Therefore, an overall communication delay is reduced.

Optionally, the processor 122 is further configured to: determine an access key of the non-3GPP network based on a NAS sequence number of the 3GPP network, a key of the 3GPP network, and a preset type identifier of the non-3GPP network.

The processor 122 is further configured to generate a second NAS verification code based on a NAS security context stored in the access device of the UE.

As shown in FIG. 10-2, the device further includes a receiver 125, configured to receive, by using the second network device, an authentication message sent by the first network device, where the authentication message is generated by the first network device when the first network device determines that the access request message includes the second NAS verification code and that the second NAS verification code is different from a first NAS verification code or when the access request message does not include a NAS verification code, and the first NAS verification code is a verification code that is generated by the first network device based on the identifier of the access device of the UE and a NAS security context of the access device of the UE that is stored in the first network device. For other reference signs in FIG. 10-2, reference may be made to reference signs in FIG. 10-1 for description.

Correspondingly, the transmitter 121 is further configured to send, by using the second network device, an authentication response message specific to the authentication message to the first network device.

Optionally, the receiver 125 is further configured to receive, by using the second network device, an access success message sent by the first network device.

The processor 122 is further configured to generate an AS key of the non-3GPP network based on the access key of the non-3GPP network.

The processor 122 is specifically configured to receive a cryptographic algorithm sent by the second network device and generate the AS key of the non-3GPP network based on the cryptographic algorithm, the access key, and the type identifier of the non-3GPP network.

Optionally, the second network device is an AP.

In conclusion, according to the access device of the UE provided in this embodiment of the present application, the transmitter can send the access request message to the first network device on the 3GPP network by using the second network device on the non-3GPP network. Therefore, compared with a related technology, in the present application, it is not required that an AAA server performs authentication on the UE, so that a delay caused in an authentication process is reduced. Therefore, an overall communication delay is reduced.

An embodiment of the present application provides an access system of UE. The access system of the UE includes:
the access device 1, of the UE, shown in FIG. 5 or FIG. 6-1; and
the access device 2, of the UE, shown in FIG. 7 or FIG. 8-1.

An embodiment of the present application provides an access system of UE. The access system of the UE includes:
the access device 3, of the UE, shown in FIG. 9; and
the access device 4, of the UE, shown in FIG. 10-1 or FIG. 10-2.

It may be clearly understood by a person skilled in the art that, for ease of convenient and brief description, for a detailed working process of the foregoing system, device, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the blocks of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present application, but are not intended to limit the present application. Any modification, equivalent replacement, and improvement made without departing from the spirit and principle of the present application shall fall within the protection scope of the present application.

What is claimed is:

1. An access method for a user equipment (UE), the method comprising:
receiving, by a first network device on a 3rd Generation Partnership Project (3GPP) network, wherein the first network device uses a second network device on a non 3rd Generation Partnership Project (non-3GPP) network, an access request message from the UE, wherein the access request message comprises an identifier of the UE;
generating, by the first network device, a first non-access stratum (NAS) verification code based on the identifier of the UE and a NAS security context of the UE that is stored in the first network device;
when the access request message comprises a second NAS verification code, detecting, by the first network device, whether the second NAS verification code is the same as the first NAS verification code, wherein the second NAS verification code is a verification code that is generated by the UE based on a NAS security context stored in the UE; and
when the second NAS verification code is the same as the first NAS verification code, sending, by the first network device, an access key of the non-3GPP network to the second network device.

2. The method of claim 1, further comprising:
determining, by the first network device, the access key of the non-3GPP network based on a NAS sequence number of the 3GPP network, a key of the 3GPP network, and a type identifier of the non-3GPP network.

3. The method of claim 2, further comprising:
obtaining, by the first network device from the NAS security context of the UE stored in the first network device, the NAS sequence number of the 3GPP network and the key of the 3GPP network; and
receiving, by the first network device, the type identifier of the non-3GPP network from the second network device.

4. The method of claim 1, further comprising:
when the second NAS verification code is different from the first NAS verification code, performing, by the first network device, security authentication on the UE; or
when the access request message does not comprise a NAS verification code, performing, by the first network device, security authentication on the UE.

5. The method of claim 1, further comprising:
obtaining, by the first network device, capability information of the UE, wherein the capability information is used to indicate a capability of the UE on the non-3GPP network; and
sending, by the first network device, the capability information to the second network device, wherein the capability information is used by the second network device to determine a cryptographic algorithm, and the cryptographic algorithm is used by the second network device to generate an access stratum (AS) key of the non-3GPP network.

6. An access method for a user equipment (UE), the method comprising:
generating, by the UE, an access request message, wherein the access request message comprises an identifier of the UE and a non-access stratum (NAS) verification code based on a NAS security context stored in the UE; and
sending, by the UE, the access request message to a first network device on a 3rd Generation Partnership Project (3GPP) network by using a second network device on a non 3rd Generation Partnership Project (non-3GPP) network.

7. The method of claim 6, further comprising:
determining, by the UE, an access key of the non-3GPP network based on a non-access stratum (NAS)

sequence number of the 3GPP network, a key of the 3GPP network, and a preset type identifier of the non-3GPP network.

8. The method of claim 6, further comprising:
generating, by the UE, the NAS verification code.

9. The method of claim 6, further comprising:
receiving, by the UE by using the second network device, an authentication message from the first network device; and
sending, by the UE by using the second network device, an authentication response message corresponding to the authentication message to the first network device.

10. The method of claim 7, further comprising:
generating, by the UE, an access stratum (AS) key of the non-3GPP network based on the access key of the non-3GPP network.

11. An access device for a user equipment (UE), the access device comprising:
a receiver, a transmitter, a processor, a bus, and a memory, wherein:
the bus is configured to connect the receiver, the transmitter, the processor, and the memory;
the receiver is configured to receive, using a second network device on a non 3rd Generation Partnership Project (non-3GPP) network, an access request message sent by the UE wherein the access request message comprises an identifier of the UE;
the processor is configured to execute a program stored in the memory, generate a first non-access stratum (NAS) verification code based on the identifier of the UE and a NAS security context of the UE that is stored in the access device of the UE, and when the access request message comprises a second NAS verification code, detect whether the second NAS verification code is the same as the first NAS verification code, wherein the second NAS verification code is a verification code that is generated by the UE based on a NAS security context stored in the UE; and
the transmitter is configured to, when the second NAS verification code is the same as the first NAS verification code, send an access key of the non-3GPP network to the second network device.

12. The device of claim 11, wherein the processor is further configured to:
determine the access key of the non-3GPP network based on a NAS sequence number of the 3GPP network, a key of the 3GPP network, and a type identifier of the non-3GPP network.

13. The device of claim 11, wherein the processor is further configured to:
when the second NAS verification code is different from the first NAS verification code, perform security authentication on the UE; or
when the access request message does not comprise a NAS verification code, perform security authentication on the UE.

14. The device of claim 11, wherein:
the processor is further configured to obtain capability information of the UE, wherein the capability information is used to indicate a capability of the UE on the non-3GPP network; and
the transmitter is further configured to send the capability information to the second network device, wherein the capability information is used by the second network device to determine a cryptographic algorithm, and the cryptographic algorithm is used by the second network device to generate an access stratum (AS) key of the non-3GPP network.

15. The device of claim 11, wherein the second network device is a wireless access point (AP).

16. An access device for a user equipment (UE), the access device comprising:
a transmitter, a processor, a bus, and a memory, wherein:
the bus is configured to connect the transmitter, the processor, and the memory;
the processor is configured to execute a program stored in the memory and generate an access request message, wherein the access request message comprises an identifier of the access device of the UE and a non-access stratum (NAS) verification code based on a NAS security context stored in the UE; and
the transmitter is configured to send the access request message to a first network device on a 3rd Generation Partnership Project (3GPP) network by using a second network device on a non 3rd Generation Partnership Project (non-3GPP) network.

17. The device of claim 16, wherein the processor is further configured to:
determine an access key of the non-3GPP network based on a NAS sequence number of the 3GPP network, a key of the 3GPP network, and a preset type identifier of the non-3GPP network.

18. The device of claim 16, wherein the processor is further configured to:
generate the NAS verification code.

19. The device of claim 16, wherein the device further comprises:
a receiver configured to receive, by using the second network device, an authentication message from the first network device and wherein the transmitter is further configured to send, by using the second network device, an authentication response message corresponding to the authentication message to the first network device.

20. The device of claim 17, wherein the processor is further configured to:
generate an access stratum (AS) key of the non-3GPP network based on the access key of the non-3GPP network.

* * * * *